(12) United States Patent
Longstaff et al.

(10) Patent No.: US 6,664,914 B2
(45) Date of Patent: Dec. 16, 2003

(54) GROUND PENETRATING RADAR

(75) Inventors: Denis Longstaff, St Lucia (AU); David Noon, St Lucia (AU); Chris Leat, St Lucia (AU); Glen Stickley, St Lucia (AU); Mikhail Cherniakov, Edgbaston (GB)

(73) Assignee: Groundprobe Pty Ltd, Adelaide (AU)

( * ) Notice: Subject to any disclaimer, the term of this patent is extended or adjusted under 35 U.S.C. 154(b) by 0 days.

(21) Appl. No.: 10/204,953

(22) PCT Filed: Feb. 28, 2001

(86) PCT No.: PCT/AU01/00206
§ 371 (c)(1),
(2), (4) Date: Oct. 17, 2002

(87) PCT Pub. No.: WO01/65277
PCT Pub. Date: Sep. 7, 2001

(65) Prior Publication Data
US 2003/0090406 A1 May 15, 2003

(30) Foreign Application Priority Data
Feb. 29, 2000 (AU) .................................................. PQ5926

(51) Int. Cl.⁷ .............................. G01S 13/88; G01V 3/12
(52) U.S. Cl. .............................. 342/22; 342/89; 342/194
(58) Field of Search .............................. 342/22, 27, 89, 342/98, 194, 195

(56) References Cited

U.S. PATENT DOCUMENTS

| | | | |
|---|---|---|---|
| 4,218,678 A | | 8/1980 | Fowler et al. |
| 4,504,833 A | | 3/1985 | Fowler et al. |
| 4,593,289 A | | 6/1986 | Newcomb |
| 5,325,095 A | | 6/1994 | Vadnais et al. |
| 5,499,029 A | * | 3/1996 | Bashforth et al. ............ 342/22 |
| 5,640,168 A | | 6/1997 | Heger et al. |
| 5,720,354 A | * | 2/1998 | Stump et al. .................. 175/26 |
| 5,912,639 A | * | 6/1999 | Beckner ....................... 342/22 |
| 5,952,954 A | * | 9/1999 | Beckner ....................... 342/22 |
| 6,091,354 A | * | 7/2000 | Beckner et al. ............... 342/22 |
| 6,377,872 B1 | * | 4/2002 | Struckman .................. 700/258 |

FOREIGN PATENT DOCUMENTS

EP          0 101 533 A1          2/1984

OTHER PUBLICATIONS

"Preliminary field results of an ultra–wideband (10–620 MHz) stepped–frequency ground penetrating radar", Stickley, G.F.; Noon et al.; Geoscience and Remote Sensing, 1997. IGARSS '97 1997 IEEE Intl, vol. 3, Aug. 3–8, 1997 Page(s): 1282–1284.*

"A 50–800 MHz stepped frequency continuous wave ground penetrating radar", Farquharson, G.; Langman, A et al Communications and Signal Processing, 1998. COMSIG '98. Proceedings of the 1998 South African Symposium on Sep. 7–8, 1998 Page(s): 455–460.*

(List continued on next page.)

*Primary Examiner*—John B. Sotomayor
(74) *Attorney, Agent, or Firm*—Workman Nydegger

(57) ABSTRACT

A ground penetrating radar includes a signal generator, a return signal processor, a gate and an antenna. The signal generator is a dual frequency synthesizer that generates a stepped frequency master signal and a tracking signal offset by an intermediate frequency. The return signal processor is a dual channel quadrature receiver that mixes down a return signal and a sample of the master signal to intermediate frequency using the tracking signal. The signal generator is pulsed by the gate and the return signal is gated at the same frequency. Hollow pyramidal antennas are also described that have an ultrawide band bowtie structure with antenna electronics located within one antenna element. A method of operating the radar is also described.

19 Claims, 10 Drawing Sheets

OTHER PUBLICATIONS

"The effect of phase noise in a stepped frequency continuous wave ground penetrating radar", van Genderen, P.; Radar, 2001 CIE International Conference on, Proceedings, Oct. 15–18, 2001 Page(s): 581–584.*

"Development of a low cost SFCW ground penetrating radar", Langman, A.; Dimaio, S.P.; Burns, B.E.; Inggs, M.R.; Geoscienc and Remote Sensing Symposium, IGARSS '96. 'Remote Sensing for aSustainable Future.', Int'l, vol.: 4, May 27–31, 1996 Ps 2020–2022.*

Motoyuki Sato et al., *Cross–polarization Borehole Radar Measurements with a Slot Antenna*, Journal of Applied Geophysics, vol. 33, 1994, pp. 53–61.

* cited by examiner

GROUND PENETRATING RADAR

This invention relates to an improved ground penetrating radar. In particular, it relates to a radar that has superior performance over known ground penetrating radar. The invention also includes an improved antenna useful with a ground penetrating radar.

BACKGROUND TO THE INVENTION

The usefulness of a radar system capable of imaging subterranean features and buried objects has been recognised for almost thirty years. In this time various systems have been developed for a broad range of applications in the mining, geotechnical, environmental and safety areas. For example, applications include: detection of underground pipes and cables; detection of buried landmines and bombs; delineation of ore bodies; detection of aquifers; road evaluation; and hazardous waste detection. Two types of ground penetrating radar exist. For deep applications a borehole radar that propagates from a generally vertical antenna is preferred. For other applications a surface ground penetrating radar that propagates from a horizontal antenna is more suitable.

A useful discussion of borehole radars can be found in a paper by Sato et al published in Journal of Applied Geophysics 33 (1995) 53–61. The Sato paper discusses improvements in the performance of a borehole radar using cross-polarization measurements compared to co-polarization measurements. Although the Sato innovation was focussed on cylindrical antennas for borehole radars, the general discussion applies to ground penetrating radars in general.

A number of commercial ground penetrating radar systems exist which are based on conventional impulse radar transmitters with sampling head receivers. The performance of these systems is limited by the low mean transmitter power and inefficient receiver sampling.

An alternative to the impulse radar approach is to use a stepped frequency (or synthetic pulse) radar. One early example of this approach is described in U.S. Pat. No. 4,218,678, assigned to Ensco Inc. The invention related to a pulse radar system employing a synthetic pulse formed from a Fourier spectrum of frequencies generated and detected by digitally controlled transmitter and receiver circuits. The radar suffered from large amounts of cross-coupling between the antennas and large mismatch between the in-phase (I) and quadrature (Q) channels of the receiver circuit. These shortcomings caused ghosts and false images in the range profiles that limited the usefulness of the radar.

An improved version of the Ensco radar was developed by Xadar Corporation (a subsidiary of Ensco) and described in U.S. Pat. No. 4,504,833. The later radar employed a heterodyne receiver operating with a fixed intermediate frequency (IF) and incorporating a single frequency quadrature system. The radar suffered from excessive noise that limited the achievable resolution. The noise originated, in part, from discontinuities in the stepped waveform. A main disadvantage with the Xadar radar (and other continuous wave, CW, radar) is that strong signals either from leakage between the transmit and receive antennas or from shallow reflectors can mask weaker signals from deep reflectors. In other words, the useful dynamic range of CW radar is inadequate for many applications.

Another commercial system was developed by Coleman Research Corporation and described in U.S. Pat. No. 5,339,080. The Coleman patent acknowledges the Ensco system and claims to overcome the shortcomings. The radar system is very sophisticated and includes expensive radar and signal processing equipment. Cost reduction is unlikely as the hardware design dictates high power signal processing to obtain useful results. Furthermore, the radar is CW and therefore suffers the same dynamic range problems mentioned above. The Coleman radar also incorporates log spiral antennas that limit performance of the system because of the varying dispersive nature of the antennas with changing ground conditions.

U.S. Pat. No. 5,325,095, assigned to the United States Department of Energy, and U.S. Pat. No. 5,499,029, assigned to EG&G Energy Measurements Inc., describe a stepped frequency ground penetrating radar that incorporates a heterodyne receiver with a 500 kHz intermediate frequency. A quadraphase modulator modulates the transmitted signal so that in-phase and quadrature signals are transmitted alternatively. The reflected signal is mixed with a portion of the transmitted signal to obtain amplitude and phase information. The invention incorporates a log spiral antenna that limits the performance of the system, as mentioned above.

Despite development of a number of different stepped frequency ground penetrating radar, there is still scope for improvement in performance. In particular, improved penetration depth, greater resolution and reduced cost are necessary if ground penetrating radar are to be more usefully employed.

OBJECT OF THE INVENTION

It is an object of the invention to provide a ground penetrating radar having improved performance compared to known ground penetrating radar.

It is a yet further object of the invention to provide an improved antenna for use with a ground penetrating radar.

It is a further object of the invention to provide an improved method of detecting subterranean features and buried objects.

Other objects of the invention will be evident from the following discussion.

SUMMARY OF THE INVENTION

In one form, although it need not be the only, or indeed the broadest form, the invention resides in a ground penetrating radar for detecting objects comprising:
  signal generation means for
    (i) generating and transmitting a stepped frequency master signal and
    (ii) generating a tracking signal offset in frequency from the master signal by an intermediate frequency; return signal processing means for
    (i) receiving a return signal reflected from the ground region and
    (ii) processing the return signal using the tracking signal and the master signal to determine amplitude values and phase values indicative of target matter; gating means for
    (i) pulsing the master signal and
    (ii) gating the return signal; and antenna means for
    (i) coupling the master signal into the ground and
    (ii) coupling a reflected signal from the ground.

It will be appreciated that the ground penetrating radar may be of the surface or borehole type.

The signal generation means is suitably a dual frequency synthesiser that generates stepped frequencies in the range between DC and GHz with kHz resolution.

Preferably, the signal generation means also generates clock signals for synchronisation of operation of the return signal processing means and gating means.

The return signal processing means preferably includes a quadrature receiver and digital signal processing means. The quadrature receiver is suitably a dual channel receiver that mixes down a sample of the master signal and the return signal to the intermediate frequency using the tracking signal.

Suitably, the quadrature receiver incorporates mixer means, bandpass filter means, analog to digital conversion means and digital down-conversion means.

The digital signal processing means is suitably one or more processor means programmed with suitable signal processing algorithms.

The antenna means are suitably hollow elements. Preferably the elements are hollow pyramids with the feed applied between the apex. Antenna electronics are preferably located in one pyramid and are preferably self-contained.

Suitably the only link to and from the antenna means is a non-RF waveguiding link, such as a fibreoptic link.

In a further form the invention resides in an antenna means for a ground penetrating radar comprising:

a pair of hollow antenna elements, each antenna element having at least an apex, said hollow antenna elements being arranged such that said apexes are adjacent but not abutting;

electronics housed in one of said pair of hollow antenna elements; and a coaxial connection between the apexes of said hollow antenna elements.

In a still further form the invention resides in a method of generating a radar signal for a ground penetrating radar including the steps of:

generating multiple narrower-band signals;

stepping said multiple narrower-band signals in frequency across an ultra-wide bandwidth;

generating a tracking signal for each narrower-band signal that is offset in frequency by an intermediate frequency from a centre frequency of said narrower-band signals; and gating said multiple narrower-band signals.

BRIEF DESCRIPTION OF THE DRAWINGS

Preferred embodiments of the invention are described with reference to the following figures in which.

DETAILED DESCRIPTION OF THE PREFERRED EMBODIMENT

Figure 1:
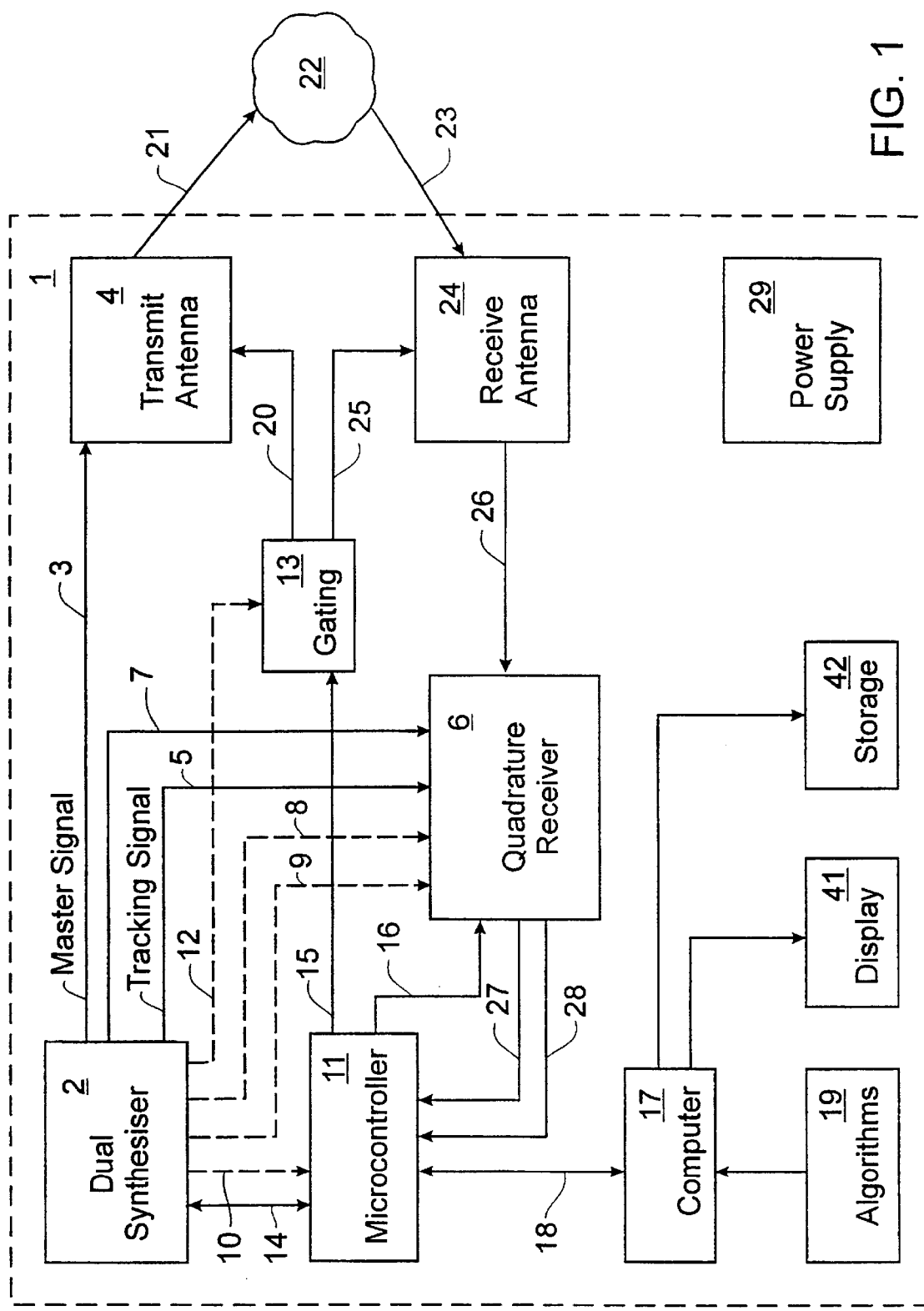
FIG. 1 is a block diagram of a stepped frequency ground penetrating radar.

Referring to FIG. 1 there is shown a block diagram of a stepped frequency ground penetrating radar 1. The method of using a stepped frequency ground penetrating radar consists of measuring the complex reflection coefficient of the ground at a number of discrete frequencies, and then transforming to the time domain, usually via a discrete Fourier transform.

The radar 1 has a dual synthesiser 2 that includes a master synthesiser that sends a master stepped frequency signal 3 to a transmit antenna 4. The dual synthesiser 2 also generates a tracking signal 5 that is offset from the master frequency by an intermediate frequency (iF). The tracking signal 5 is sent to the quadrature receiver 6, as is a sample 7 of the master signal 3.

The dual synthesiser 2 also generates clock signals including analog to digital conversion clock signal 8 and digital signal processing clock signal 9 for quadrature receiver 6, a microcontroller clock signal 10 for the microcontroller 11, and a gating clock signal 12 for the gating means 13.

The microcontroller 11 handles all the system control tasks on digital control lines 14, 15 and 16 including stepping the synthesiser frequency, data acquisition, gating, attenuators and power switching. The microcontroller 11 also streams or buffers IQ data to a computer 17, such as a laptop, on serial link 18. The computer 17 receives the data stream, computes the fast Fourier transform (FFT) and displays the data in real time. Suitable algorithms 19 for real-time and post-processing of the IQ data are stored and run on the computer 17.

The master signal 3 is coupled to the transmit antenna 4 by an analogue optical link to avoid guided wave paths between the antennas. A gating signal 20 from gating means 13 is coupled to the transmit antenna 4 by a digital optical link. A transmitted signal 21 is the modulation of the master signal 3 and the gating signal 20. The transmitted signal 21 is transmitted into a target area and is reflected by a target object 22 to produce reflected signal 23 which is received by receive antenna 24.

The receive antenna 24 is gated by gating signal 25 from gating means 13 so that only reflected signals 23 in a desired range band are received. The received signal 26 is sent to quadrature receiver 6 by optical link.

The quadrature receiver 6 is a dual channel receiver that mixes down the master reference signal 7 and received signal 26 to the intermediate frequency using the tracking signal 5. Two 14 bit ADCs convert the analog IF received signal and reference signal to digital form for digital signal processing to calculate $I_{sig}$ and $Q_{sig}$ and $I_{ref}$ and $Q_{ref}$. The calculated $I_{sig}$ and $Q_{sig}$ are passed to the microcontroller 11 on serial line 27 and reference $I_{ref}$ and $Q_{ref}$ are passed on serial line 28. Microcontroller 11 streams or buffers $I_{sig}$, $Q_{sig}$, $I_{ref}$ and $Q_{ref}$ to the computer 17 for further processing.

Power supply 29 provides power for all analog and digital components except the antennas 4, 24. Independent supplies (batteries or generators) are provided within the antennas. The only connection between the antennas and the rest of the radar is by optical link.

Figure 2:
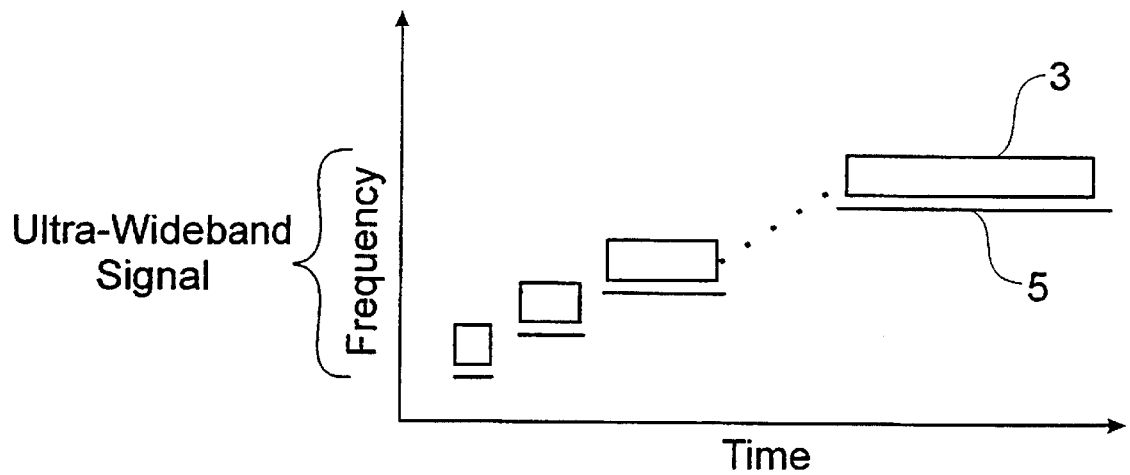
FIG. 2 shows details of the generation of stepped frequencies.

An ultra-wideband signal is generated by transmitting multiple narrower-band signals that are stepped or hopped across an ultra-wide bandwidth. Examples of narrower-band signals are continuous waves, square waves, pulsed waves, narrowband and band-limited noise, frequency modulated waves, chirp waves, etc. The multiple narrower-band signals can be stepped successively in frequency or hopped non-successively in frequency. The duration of each frequency step or hop can be variable depending on the attenuation of frequency signals by the ground. A tracking signal that is offset in frequency (either positive or negative offset) by an intermediate frequency (IF) is generated for each narrower-band signal step or hop. The technique is displayed in FIG. 2.

Figure 3:
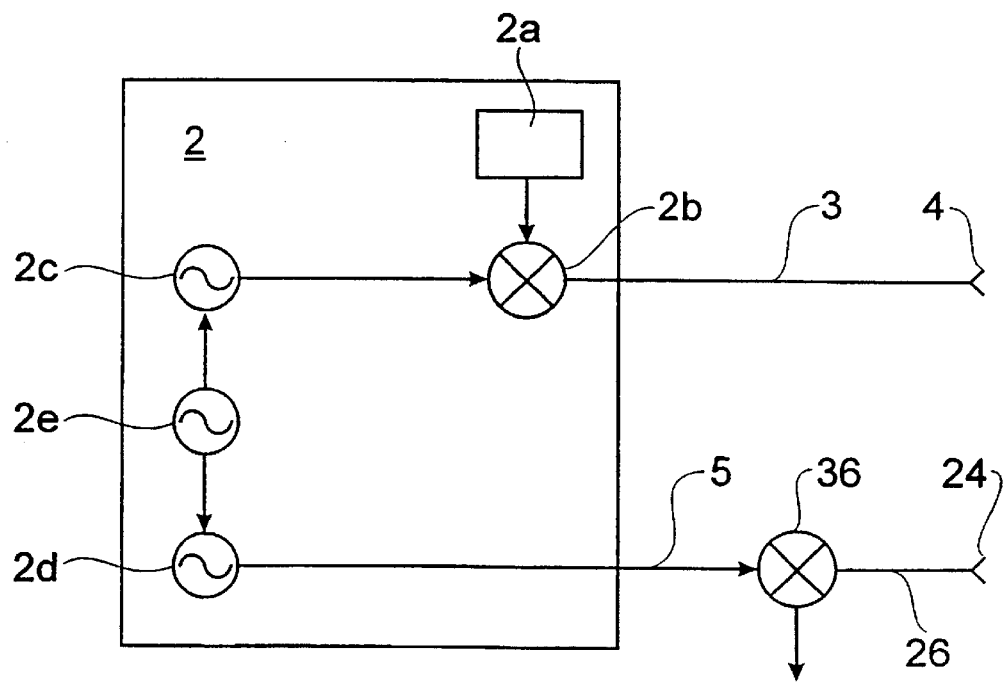
FIG. 3 is a schematic of the dual synthesiser.
Figure 4:
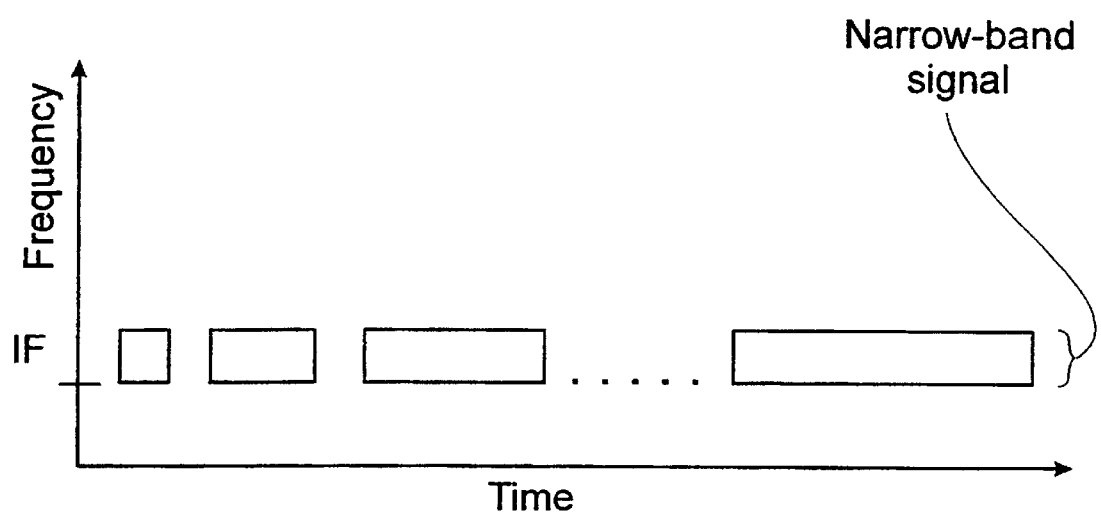
FIG. 4 shows details of down-conversion to intermediate frequency.

The function of the dual synthesiser 2 is shown in detail in FIG. 3. The dual synthesiser comprises a narrower-band signal generator 2a that is mixed 2b with the master channel 2c to form the master signal 3, and a tracking channel 2d that provides the tracking signal 5. A reference oscillator 2e provides a base signal reference for the master channel 2c and tracking channel 2d. The reference oscillator 2c also provides the clock signals 8, 9, 10 and 12 described above. The tracking signal 5 is offset from the master signal 3 by the intermediate frequency. The reflected multiple narrower-band signals 26 are down-converted to the intermediate frequency through mixing with the tracking signal 5, as shown in FIG. 4. The IF signal is then digitally down-converted to baseband. This process is described in greater detail below. The duration of the narrower-band signals can be variable with frequency step or hop to allow greater or less integration time in sampling for each frequency. This method helps to overcome the low pass filtering effect on the ground attenuation with respect to frequency of the received signals. Aspects of this approach are described in "Optimal Step Frequency Signals for a Ground Penetrating Radar" by Cherniakov, M in Electronics Letters, Vol 32, pp 62–64, 1996.

In a specific embodiment of the invention, the dual synthesiser generates sinusoidal continuous waves that are stepped successively in frequency. The tracking channel 2d is offset from the master channel 2c by an intermediate frequency. The mixing of the master signal and the tracking signal from each frequency step produces a continuous sinusoidal wave at the intermediate frequency.

In another specific embodiment of the invention the master signal is a large number of discrete frequencies generated simultaneously across a band. The band of operation can then be stepped across an ultra-wide band. Preferentially the phases of the various frequencies are chosen to minimise the excursion of the signal. The tracking channel is a continuous signal offset in frequency from the centre of the band of the master signal. For example, the tracking signal is two-thirds of the way between the two centre discrete frequencies of the master signal. The mixing of the master signal and the tracking signal produces an intermediate frequency band made up of a large number of discrete frequencies.

Figure 5:
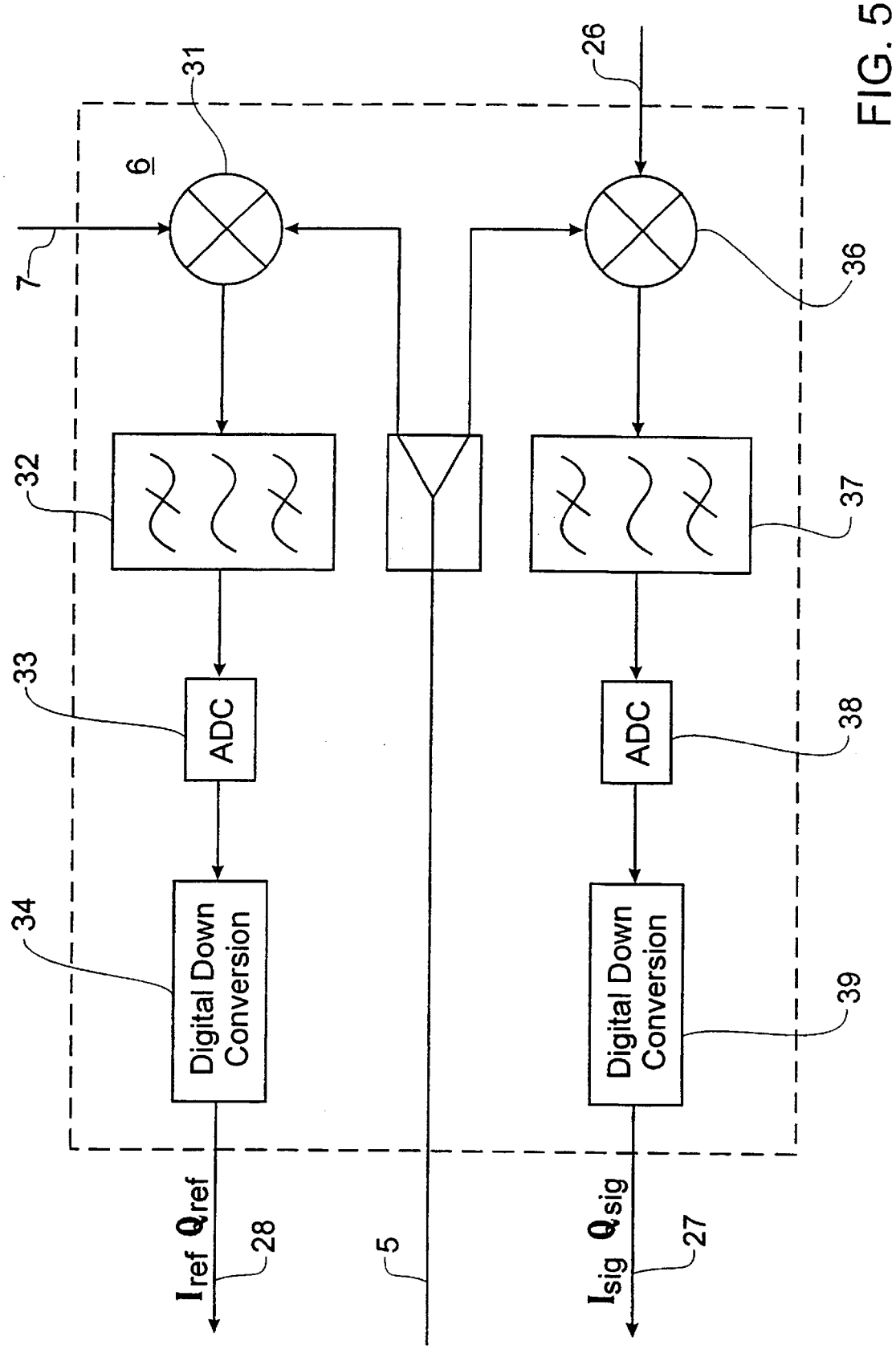
FIG. 5 is a schematic of the quadrature receiver.

FIG. 5 shows the structure of the quadrature receiver 6 in greater detail. A portion 7 of the master signal 3 is mixed with the tracking frequency 5 in mixer 31 to the IF. The band-pass filter 32 allows the IF signal to pass to the analog-to-digital converter (ADC) while removing mixing products at high frequency and DC and other spurious signals. The filtered IF signal is digitised in ADC 33 and digitally down-converted 34 to produce $I_{ref}$ and $Q_{ref}$ 28. This process is discussed in greater detail below with reference to FIG. 6.

The sampling rate of the ADC must be at least twice the bandwidth of the narrower-band signal according to Nyquist's criterian. Multiple samples of the filtered IF signal can be averaged to increase signal to noise ratio. The received signal 26 is mixed with the tracking signal 5 in mixer 36. Equivalent processing is performed in band-pass filter 37, ADC 38, and digital down-converter 39 to produce $I_{sig}$ and $Q_{sig}$ 27.

Figure 6:
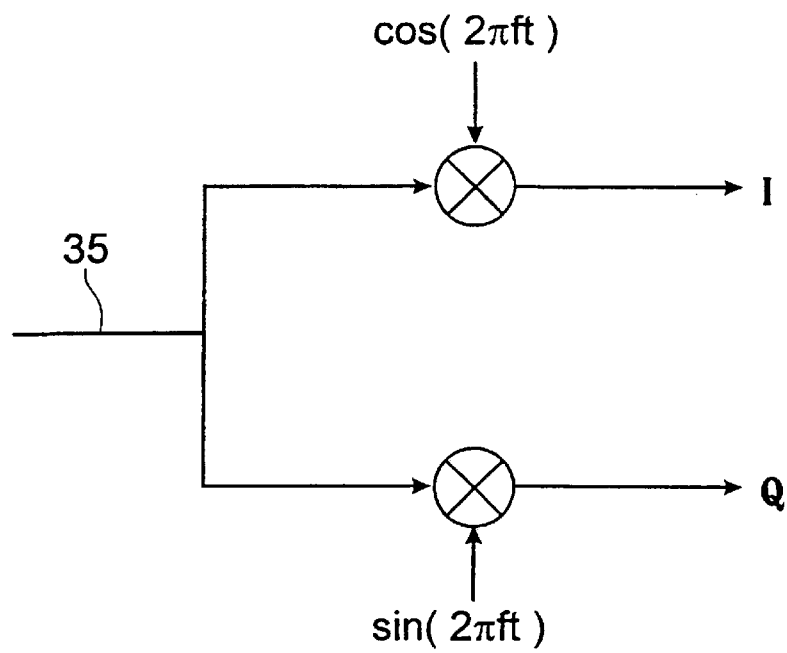
FIG. 6 shows the function of the digital down-conversion.

The operation of the digital down-converters 34, 39 are described with reference to FIG. 6. The digitised IF 35 is split into two components. One component is multiplied by $\cos(2\pi f_{IF} t_n)$ to represent the in-phase (I) signal of the IF. The other component is multiplied by $\sin(2\pi f_{IF} t_n)$ to represent the quadrature (Q) signal of the IF. In the functions, $f_{IF}$ is the intermediate frequency and $t_n$ is the sampling interval of the ADC. Both I and Q signals are sent to the computer 17 for digital signal processing.

The advantage of digital down-conversion over using analog quadrature mixers is that the signal is sampled at the intermediate frequency chosen to avoid spurious signals, such as DC offsets, flicker, noise, mixing products, gating products and other internal system interference. The intermediate frequency can be dynamically switched to avoid these spurious signals. In addition, there are no in-phase and quadrature errors that may cause ghosts and false images (Hermitian images) to appear in range profiles.

Figure 7:
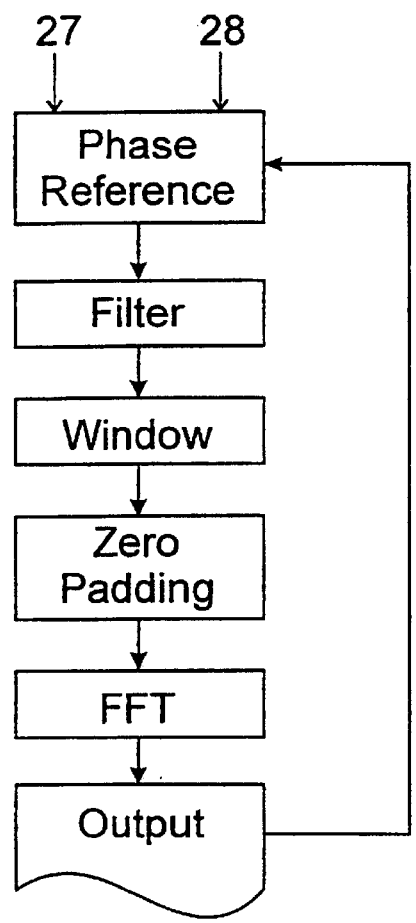
FIG. 7 shows a method of signal processing.

Digital signal processing is performed in the computer 17. It is convenient to also use the display 41 and storage facilities 42 of the computer, although separate components can be used if desired. A flowchart for the digital signal processing algorithm is provided in FIG. 7.

The $I_{sig}$ and $Q_{sig}$ components are phase referenced to the $I_{ref}$ and $Q_{ref}$ components and put into complex form (I+jQ). The resulting discrete signal is filtered to emphasise responses from distant targets and de-emphasise responses from near targets. A window function is then applied to the discrete signal to reduce sharp transitions in the frequency domain prior to transformation to the time domain. The resulting discrete signal is padded at the beginning with enough zero samples to reverse is the down-conversion from RF to IF. The discrete signal is then transformed to the time-domain (eg. FFT algorithm) with extra zero padding at the end for adequate interpolation of the time-domain signal. The real component, imaginary component, a linear combination of the two, or magnitude of the time profile is the output.

Figure 8:
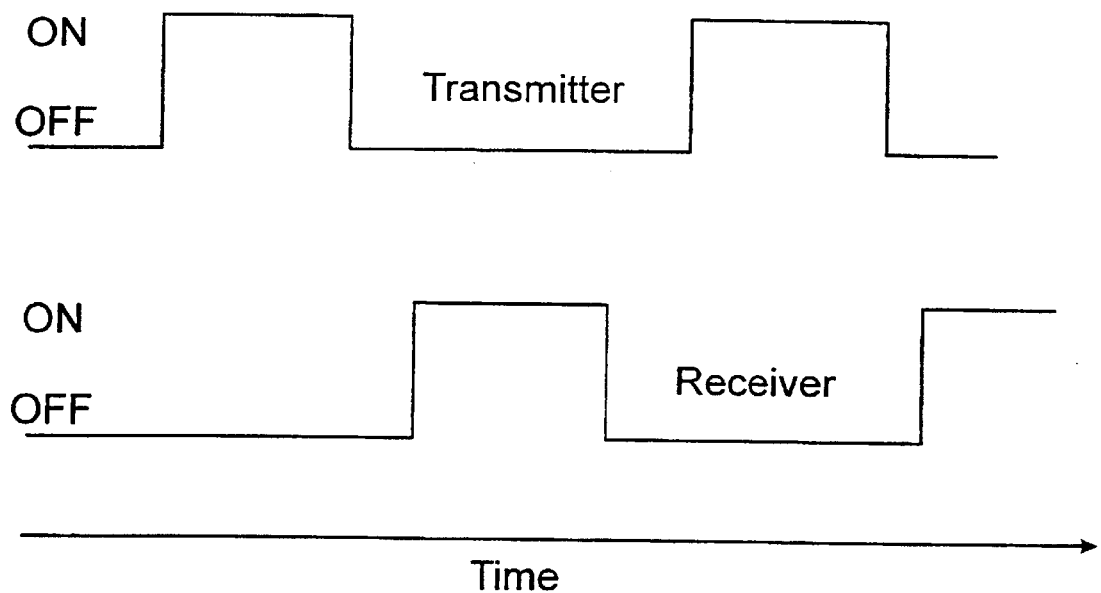
FIG. 8 shows typical gating functions.

The gating means 13 generates gating signal 20, 25 according to parameters received from microcontroller 11 on digital control line 15. An example of suitable gating signals is shown in FIG. 8. As discussed with reference to the prior art, a disadvantage with continuous-wave operation of the stepped frequency radar is that strong signals either from leakage between the transmit and receive antennas or from shallow reflectors can mask weaker signals from deep reflectors. Gating overcomes this disadvantage by rejecting unwanted reflections while maintaining the high average power and efficient sampling of the stepped frequency radar.

Figure 9:
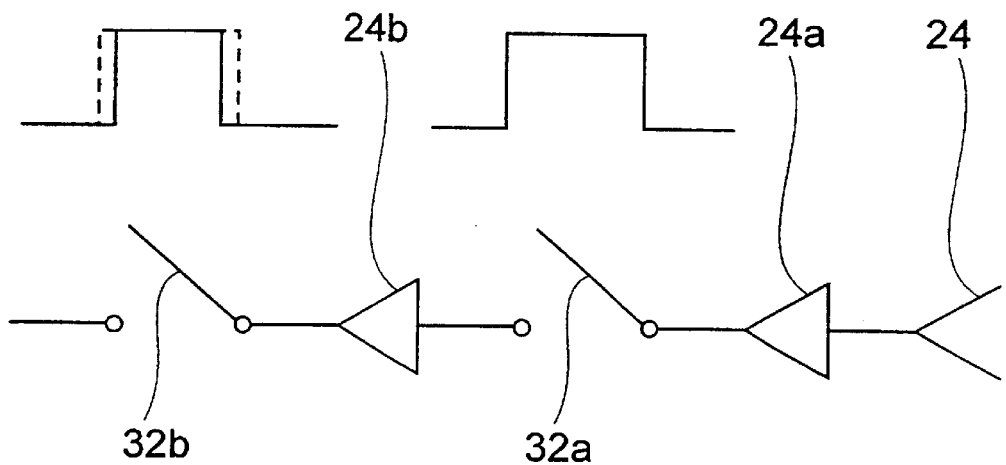
FIG. 9 shows an alternate gating function.

An improved gating signal for the receive antenna 24 is shown in FIG. 9. In some cases, the control signal used to operate switch 32 can cause spurious signals on the received signal 26. These can be reduced by using an inner and outer gate, as shown in FIG. 9. Signals from the receive antenna 24 are amplified in pre-amplifier 24a and outer gated by switch 32a. The switch is driven with the square wave control signal shown. The resultant signal is further amplified in amplifier 24b, which will also amplify any part of the control signal that has leaked to the received signal. The undesired leak signal is gated out by switch 32b which has an inner gate control signal applied. The inner gate is slightly narrower than the outer gate, as indicated by the dashed lines in FIG. 9. The gating frequency can be chosen to minimise spurious signals at the intermediate frequency.

In a specific embodiment of the quadrature receiver an intermediate frequency,band made up of a large number of discrete frequencies is digitized in and ADC. This data can then be batch averaged if desired. The averaged data is analysed with a Fast Fourier Transform algorithm to determine phase and amplitude, alternatively I and Q, at each of the discrete frequencies in the intermediate frequency band. In this embodiment the gating frequency must be chosen to avoid interference with any of the discrete frequencies.

Figure 10:
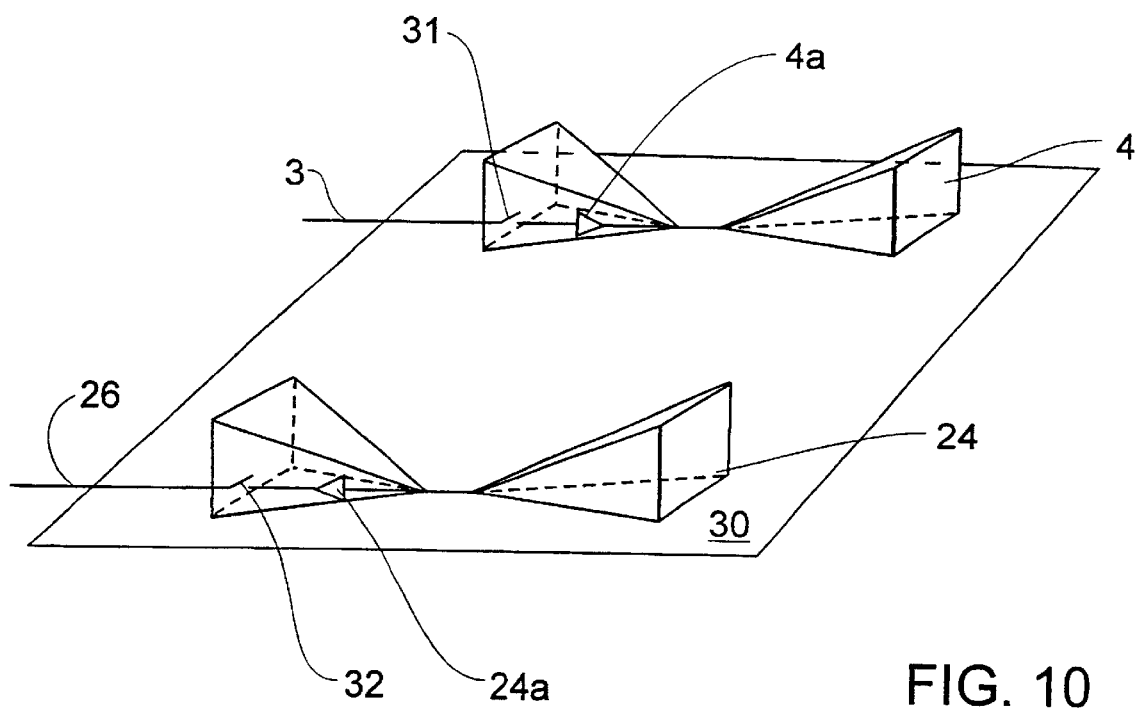
FIG. 10 shows an antenna design.

The antennas 4, 24 are ultrawideband bowtie antennas, modified from the two dimensional form by having the bowtie antenna elements comprise the sides of two, hollow, rectangular-based pyramids as shown in FIG. 10. The pyramid apexes approach each other closely, as do bowtie triangle points, with feed being applied between the apexes. The antennas 4, 24 are mounted together in an antenna sub-system 30 with suitable shielding.

The depiction of FIG. 10 is for a surface ground penetrating radar in which the antennas are arranged with parallel longitudinal axes. Other orientations are as valid, for example a borehole application will have the longitudinal axes of the antennas aligned coaxially.

The pyramids of each antenna 4, 24 are externally identical. Antenna electronics for each are housed inside one of the hollow pyramids and include a switch 31, 32 driven by signals received from the gating means 13. The only externally discernable difference between the pyramids is a fibre optic connection to the pyramid housing the electronics and a coaxial connection between the pyramids has the outer conductor connected to the pyramid housing the electronics and the inner conductor connected to the other pyramid.

The purpose of the whole design is to electromagnetically shield the asymmetry, eliminating the need for a balun whilst maintaining the wide bandwidth characteristic of antennas angularly defined with respect to a point of symmetry. The antenna does not, therefore, radiate unbalanced modes and avoids the guidance of spurious noise along conductors.

The power of the transmitted signal can be boosted by a linear or non-linear high power amplifier 4a incorporated in the antenna. A low noise amplifier 24a can be incorporated in the receive antenna to boost received signal, as previously discussed.

Figure 11:
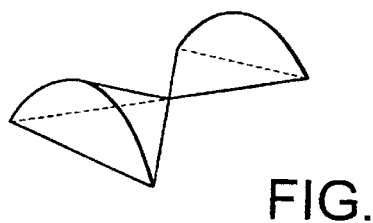
FIG. 11 shows an alternate antenna design.
Figure 12:
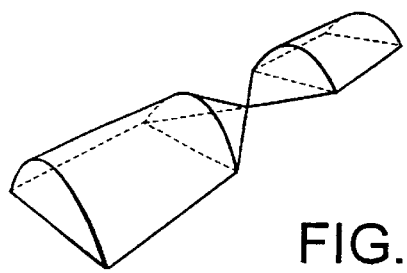
FIG. 12 shows the design of FIG. 11 with an extended volume.
Figure 13:
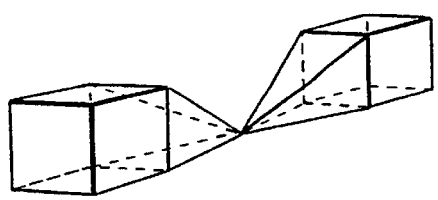
FIG. 13 shows an extended volume version of the antenna of FIG. 10.

Although a hollow, rectangular based pyramid is the preferred form of the antenna elements, designs which adhere to the angle defined structure with respect to a point of symmetry may also be used. FIG. 11 shows one variation where each pyramid is a bisected cone. The pyramids can be scaled in size to provide additional space for electronics. To avoid very high elements that become heavy and difficult to handle, the pyramid ends can be extruded to provide the additional volume as shown in FIG. 12 and FIG. 13.

Although these designs represent a relaxation of the strict principle of angular definition with respect to the feed point they achieve additional internal volume while limiting total volume of the antenna subsystem 30.

Figure 14:
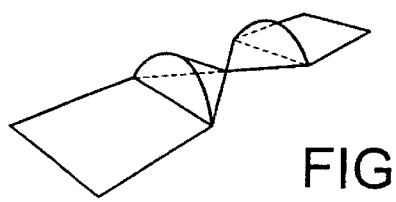
FIG. 14 shows the antenna of FIG. 11 with ground plane aprons.
Figure 15:
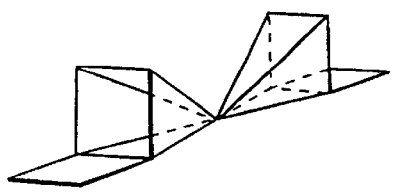
FIG. 15 shows the antenna of FIG. 10 with ground plane aprons.

Other variations for the surface type of ground penetrating radar are shown in FIG. 14 and FIG. 15 in which ground extensions are placed as aprons from the pyramids. The extensions increase the length of the antennas without increasing volume. The material of the extensions may be conducting or resistive as required to minimize ringing.

Figure 16:
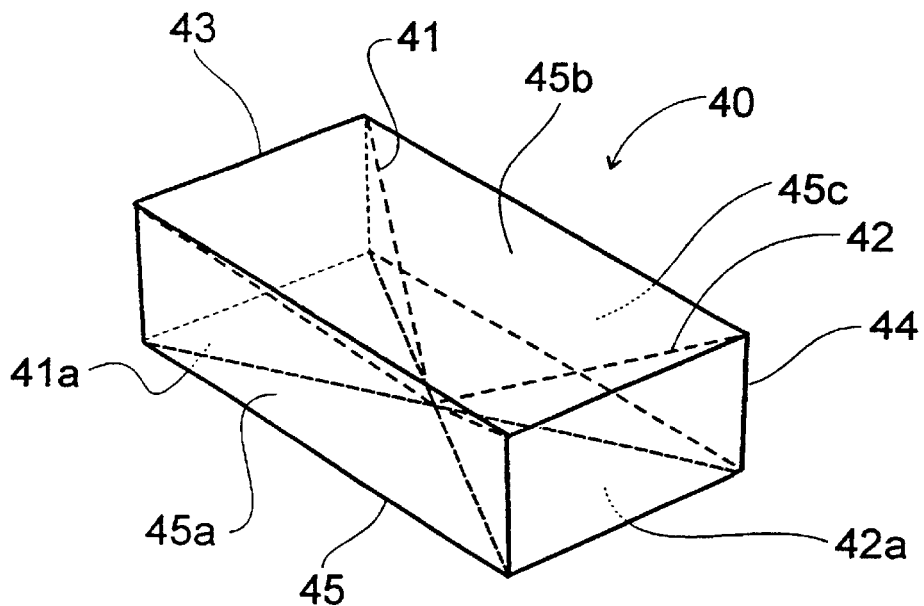
FIG. 16 shows a further antenna design with enclosed volume.

As mentioned above, the antennas are provided with shielding to reduce electromagnetic emissions. A suitable shield may be a metallic box to which the pyramid elements are connected at their large ends with resistive material or discrete resistance elements incorporated to reduce ringing. The lower limit of the box size is when the height of the box is the same as the height of the pyramids and the length of the box is equal to the overall length of the two pyramids. An antenna according to this design is shown in FIG. 16. The antenna 40 comprises a pair of pyramids 41, 42. Each pyramid has a triangular face 41a and 42a respectively. The pyramids each have a rectangular end 43, 44. A covering box 45 is formed by three metal plates 45a, (side), 45b (top), and 45c (side).

Figure 17:
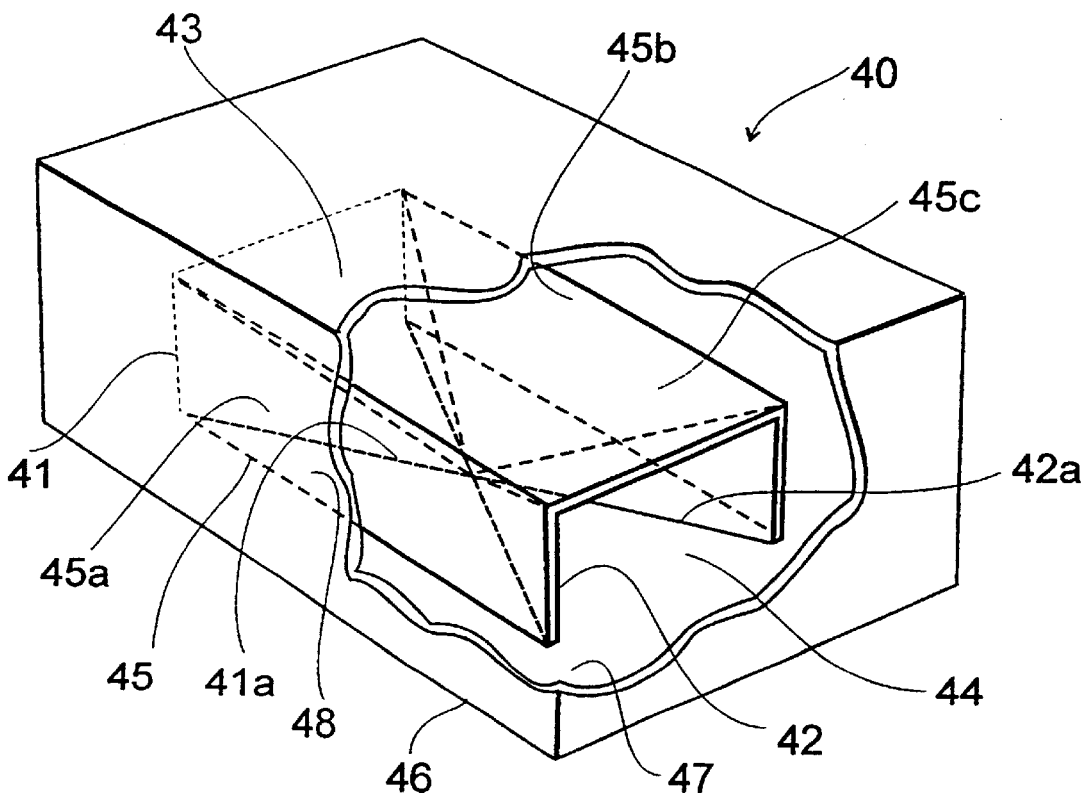
FIG. 17 shows the antenna of FIG. 16 with shielding.
Figure 18:
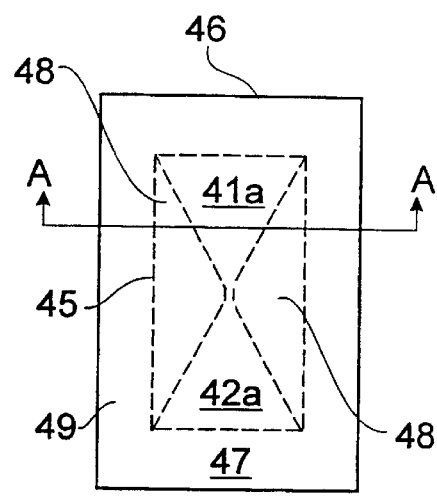
FIG. 18 shows a plan view of the antenna of FIG. 17.

A larger metallic box 46 is placed over the pyramids 41, 42 and box 45. It will be appreciated that if the pyramids 41, 42 are electrically connected to the shield box 45, the ends and base of the box can be removed without effect upon the fields inside the box. This forms a cavity 47 which communicates with the internal cavities of the pyramids, as shown in FIG. 17. A plan view of the antenna of FIG. 17 is shown in FIG. 18. It will be noted that spaces 48 are formed between the box 45 and the pyramids 41, 42 and the spaces 48 are open but the cavity 47 is closed by base 49. This can be seen most clearly in the cross-section of FIG. 19 taken through the line AA in FIG. 18. The shaded areas are the joined volumes of the internal of the antenna 41 and the cavity 47.

The whole volume of the cavity 47 and the pyramids 41, 42 can be used to store electronics. Alternatively, the pyramids could be solid blocks and electronics could be stored in the cavity 47. The antenna of FIG. 17 also offers improved mechanical stability compared to the other designs described.

Figure 20:
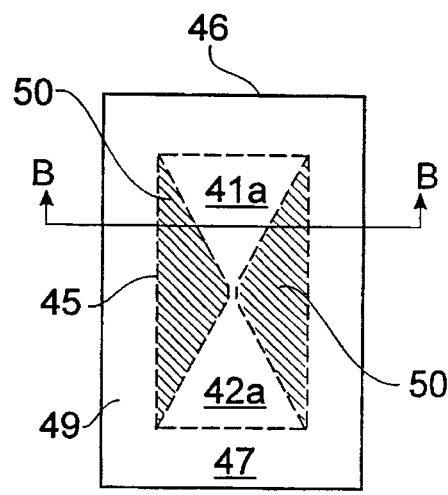
FIG. 20 shows a plan view of the antenna of FIG. 17 with lossy dielectric.

In a further embodiment shown in plan in FIG. 20, a layer of dielectric material 50 may be used to partially fill the spaces 48. The lower surface of the layer coincides with the lower surface of the antenna and the upper surface is parallel to the lower surface. The dielectric material 50 may fill between 10% and 100% of the height of the spaces 48. A suitable dielectric material will be lossy and have a high dielectric constant, such as various solutions of ionic salts in water, or such as moist sand.

Figure 21:
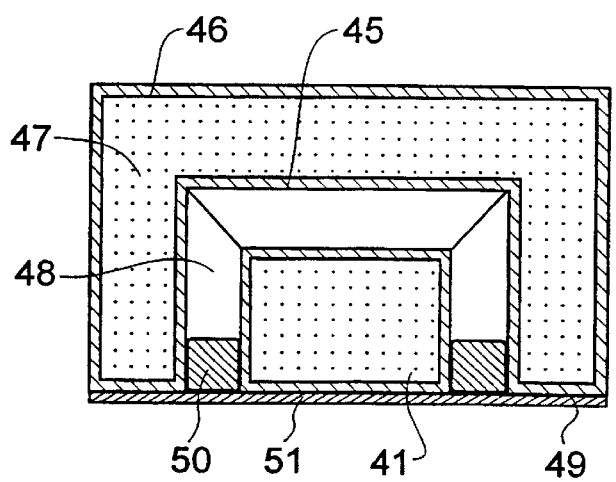
FIG. 21 shows a cross-section through the line BB in FIG. 20.

In the case of liquid or powder dielectrics, a solid dielectric window 51 is used to retain them, as shown in FIG. 21. The purpose of the dielectric layers is to increase the apparent electrical size of the antenna while reducing the product of the lower frequency cut-off and the antenna size without reducing relative bandwidth.

The antennas are powered by an internal battery in either hollow pyramid or in the cavity 47, but could be powered by solar cells or non-metallic connections such as pneumatics, hydraulics, photovoltaics, induction, mechanical transmission, etc.

Field Trials

Development versions of the radar have been tested in several different situations. The radar is housed in a shock-mounted, portable rack that can be accommodated in the back of a 4WD vehicle. Power is drawn from the 12VDC system of the vehicle or from a 240VAC generator. Rechargeable batteries provide power to the antenna subsystem sufficient for a typical day of operation.

Figure 22:
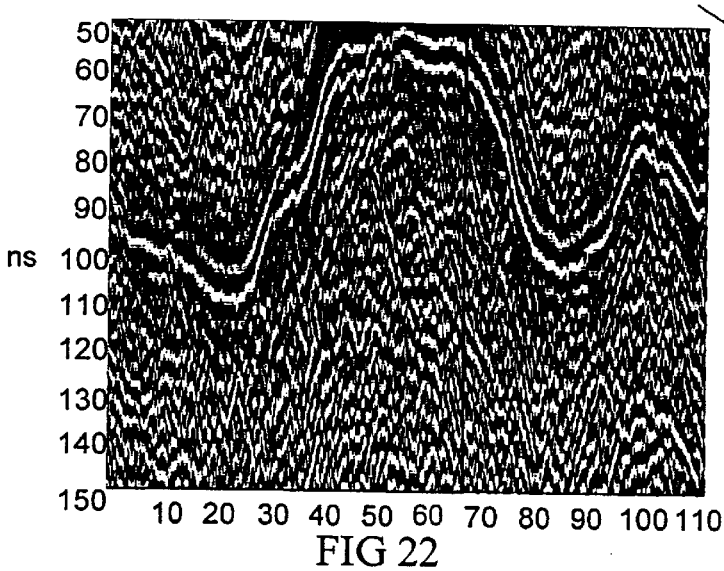
FIG. 22 shows the image of a water table taken with the invention using the antenna of FIG. 10.

FIG. 22 shows a radar image of a water table below a varying ground surface taken with this invention and using the antenna of FIG. 10. At this site the water table is horizontal but the ground surface is undulating, hence the depth of the water table below the surface varies between about three metres and six metres. Cross-coupling between the transmit and receive antennas has been gated out by setting the gating means to reject all received signals with delays less than 50 ns. The water table reflection 50 is clearly detected for the entire length of the 110 metre scan. The antenna means has a centre frequency of 125 MHz, and the signal generating means was stepped between 50 MHz and 350 MHz. The data collection time for each trace was set at 3.2 ms. An automatic gain control function was applied to the data in post-processing.

Figure 23:
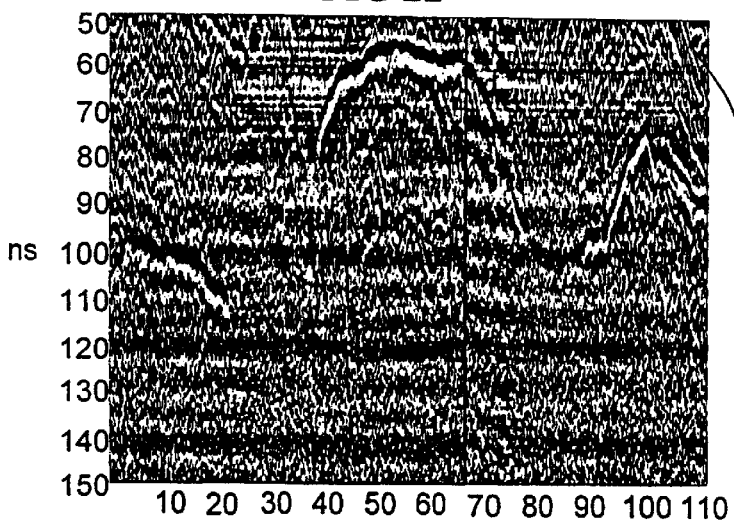
FIG. 23 shows the image of the water table of FIG. 22 taken with a prior art radar.

FIG. 23 shows a radar image of the same varying water table reflection as FIG. 12 using a commercial ground penetrating radar system based on an impulse transmitter. The water table reflection 51 is not clearly detected for part of the entire length of the 110 meter scan. The system used a commercial antenna with a centre frequency of 100 MHz. The data collection time for each trace was set at 20 ms. The same automatic gain control function as used in FIG. 19 was applied to the data in post-processing.

Figure 19:
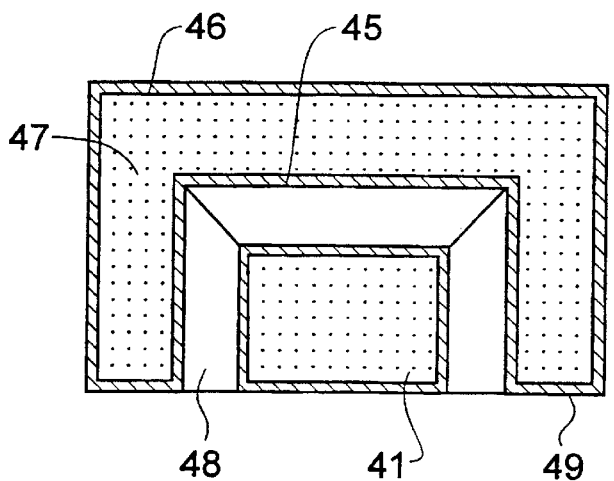
FIG. 19 shows a cross section through the line AA in FIG. 18.

Comparing FIGS. 19 and 20 shows that the invention of this patent provides significant improvement over prior art ground penetrating radar performance.

Figure 24:
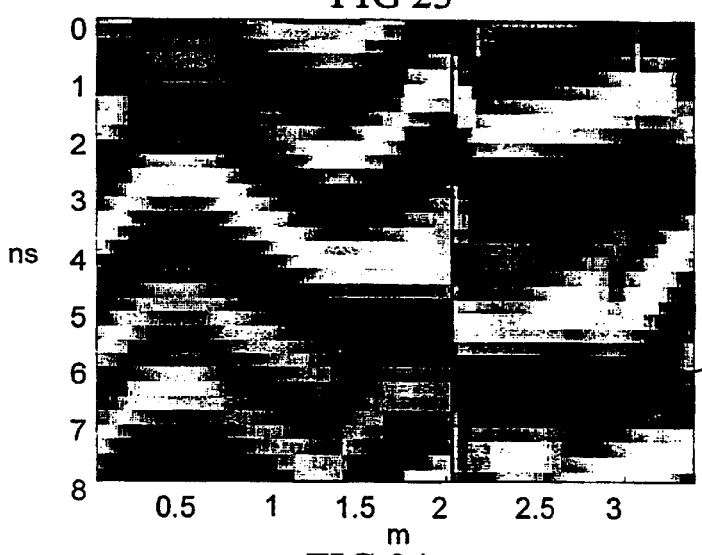
FIG. 24 shows the image of a spanner buried in sand using the antenna of FIG. 17.

FIG. 24 shows the radar image of a 30 cm long spanner buried approximately 20 cm in sand taken using the antenna of FIG. 17. The hyperbola 52 is clearly evident in the image. The antenna means has a center frequency of 400 MHz, and the signal generating means was stepped between 110 MHz and 610 MHz. A background subtraction algorithm and automatic gain control function was applied to the data in post-processing.

What is claimed is:

1. A ground penetrating radar for detecting objects comprising:
    signal generation means for
        (i) generating and transmitting a stepped frequency master signal and
        (ii) generating a tracking signal offset in frequency from the master signal by an intermediate frequency;
    return signal processing means for
        (i) receiving a return signal reflected from the ground region and
        (ii) processing the return signal using the tracking signal and the master signal to determine amplitude values and phase values indicative of target matter;
    gating means for
        (i) pulsing the master signal and
        (ii) gating the return signal; and
    antenna means for
        (i) coupling the master signal into the ground and
        (ii) coupling a reflected signal from the ground.

2. The ground penetrating radar of claim 1 wherein the signal generation means is suitable a dual frequency synthesizer that generates stepped frequencies in the range between DC and GHz with kHz resolution.

3. The ground penetrating radar of claim 1 wherein the signal generation means generates clock signals for synchronisation of operation of the return signal processing means and gating means.

4. The ground penetrating radar of claim 1 wherein the return signal processing means includes a digital quadrature receiver and digital signal processing means.

5. The ground penetrating radar of claim 4 wherein the quadrature receiver is a dual channel receiver that mixes down a sample of the master signal and the return signal to the intermediate frequency using the tracking signal.

6. The ground penetrating radar of claim 4 wherein the quadrature receiver incorporates mixer means, bandpass filter means, analog to digital conversion means and digital down-conversion means.

7. The ground penetrating radar of claim 4 wherein the digital signal processing means is suitably one or more processor means programmed with suitable signal processing algorithms.

8. The ground penetrating radar of claim 1 wherein the antenna means are hollow elements.

9. The ground penetrating radar of claim 1 wherein the hollow elements are hollow pyramids aligned to have pairs of pyramids with adjacent apexes with a signal feed applied between the adjacent apexes.

10. A method of generating a radar signal for a ground penetrating radar including the acts of:
    generating multiple narrower-band signals;
    stepping said multiple narrower-band signals in frequency across an ultra-wide bandwidth;
    generating a tracking signal for each narrower-band signal that is offset in frequency by an intermediate frequency from a center frequency of said narrower-band signals; and
    gating said multiple narrower-band signals.

11. The method of claim 10 wherein said narrower-band signals are stepped successively in frequency.

12. The method of claim 10 wherein said narrower-band signals are hopped non-successively in frequency.

13. The method of claim 10 wherein the duration of said narrower-band signals is variable.

14. The method of claim 10 wherein stepping said narrower-band signals involves a variable step or hop.

15. The method of claim 10 wherein the narrower-band signals are continuous sinusoidal waves.

16. The method of claim 10 wherein the narrower-band signals are noise signals.

17. The method of claim 10 wherein the narrower-band signals are the sum of many continuous sinusoidal waves of discrete frequencies.

18. A method of detecting objects with a ground penetrating radar including the steps of:
    generating a stepped frequency radar signal;
    pulsing said stepped frequency radar signal at a gating frequency;
    transmitting the pulsed, stepped frequency radar signal into a region;
    receiving reflected radar signals from said buried object in said region;
    gating said received signals at said gating frequency;
    down-converting said gated received signals to an intermediate frequency by mixing with a tracking signal;
    digitally down converting said intermediate frequency to baseband; and
    analysing a resulting radar image to detect said objects.

19. The method of claim 18 wherein said step of gating said received signals includes applying an inner gate and an outer gate to said received signals.

* * * * *